US006669358B2

(12) United States Patent
Shimoda

(10) Patent No.: US 6,669,358 B2
(45) Date of Patent: Dec. 30, 2003

(54) COLORED PLASTICS MOLDING DEVICE HAVING AN AUTOMATIC CALIBRATION FUNCTION

(75) Inventor: Toshio Shimoda, Soka (JP)

(73) Assignee: Sysko Corporation, Saitama-ken (JP)

( * ) Notice: Subject to any disclaimer, the term of this patent is extended or adjusted under 35 U.S.C. 154(b) by 0 days.

(21) Appl. No.: 10/094,659

(22) Filed: Mar. 12, 2002

(65) Prior Publication Data
US 2003/0095468 A1 May 22, 2003

(30) Foreign Application Priority Data
Nov. 19, 2001 (JP) ....................... 2001-353474

(51) Int. Cl.⁷ ............................................... B29B 7/60
(52) U.S. Cl. ..................... 366/76.2; 366/76.6
(58) Field of Search ................ 366/76.1, 76.2, 366/76.9, 76.91, 76.92, 76.93, 151.1, 160.2, 160.3, 162.1, 76.6; 425/145

(56) References Cited

U.S. PATENT DOCUMENTS

| | | | |
|---|---|---|---|
| 4,259,277 A | * | 3/1981 | Hill |
| 5,110,521 A | * | 5/1992 | Moller |
| 5,116,547 A | * | 5/1992 | Tsukahara et al. |
| 5,225,210 A | * | 7/1993 | Shimoda |
| 5,282,548 A | * | 2/1994 | Ishihara |

FOREIGN PATENT DOCUMENTS

EP    507689   * 10/1992

* cited by examiner

Primary Examiner—Charles E. Cooley
(74) Attorney, Agent, or Firm—Wenderoth, Lind & Ponack, L.L.P.

(57) ABSTRACT

A colored plastics molding device can perform automatic calibration, and thus colorant can be charged, being free from wrong calculation and error, and therefore, high-quality colored plastics molded items can be obtained. The colored plastics molding device 1 comprises a hopper 2 which stores a raw plastics material for molding having a thermoplasticity and discharges the raw plastics material stored; a cylindrical transfer member 3 which transfers the raw plastics material from this hopper 2; a colorant supply device 5 which supplies a liquid colorant to the inside of the transfer member 3, the discharge end of a freely replaceable nozzle 23 being disposed there; a conveying device 4 which mixes the raw plastics material fed through the transfer member 3 with the colorant, while conveying the mixture for molding; a detection device 12 which detects the conveying state of the conveying device 4; and a control part 25 which performs operation control of the colorant supply device 5 on the basis of the result of detection by this detection device 12; wherein the colorant supply device has an automatic calibration function which allows automatic setting of the quantity of liquid colorant to be supplied.

1 Claim, 3 Drawing Sheets

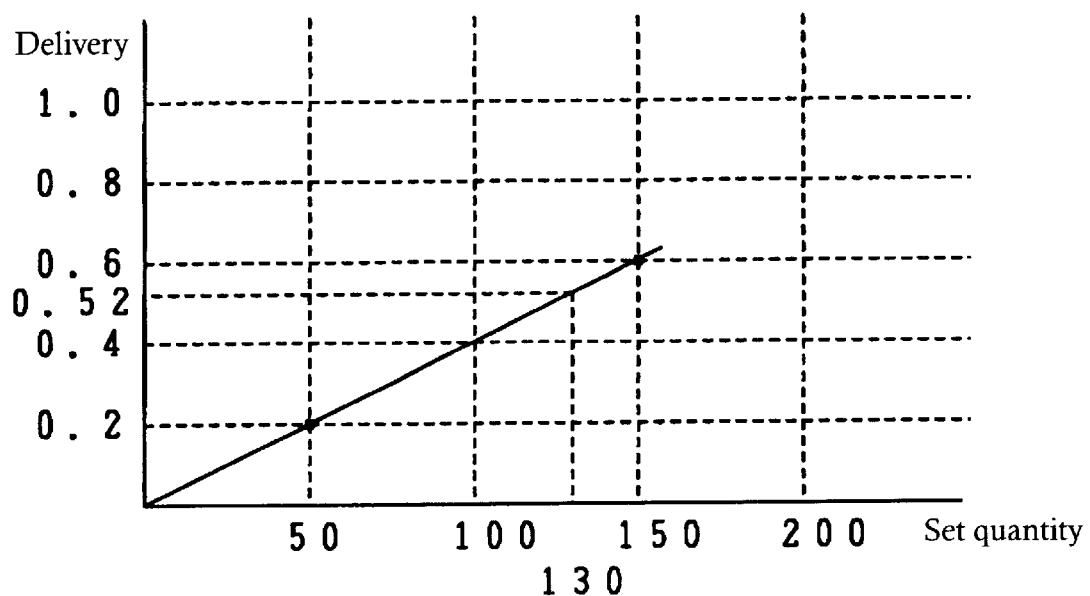

COLORED PLASTICS MOLDING DEVICE HAVING AN AUTOMATIC CALIBRATION FUNCTION

BACKGROUND OF THE INVENTION

1. Field of the Invention

The present invention relates to a colored plastics molding device, particularly, to a colored plastics molding device which colors the raw plastics material for molding having a thermoplasticity by mixing it with a liquid colorant for molding.

2. Prior Art

As an example of conventional device of this type, a device comprising a hopper which stores and discharges the raw plastics material; a conveying means which comprises a screw disposed on the discharge side of the hopper; and a head which compresses the raw plastics material conveyed by this conveying means while supplying it to the mold or the like is well known.

However, with said conventional device, the raw plastics material is mixed with a colorant liquid color) inside the hopper when the raw plastics material is to be colored with a colorant for obtaining a colored molded item.

To accurately determine the set quantity of colorant, it is necessary to make calibration for each particular colorant used, because the delivery varies depending upon the specific gravity and viscosity of the colorant used.

Conventionally, a small container, such as a plastic cup, a paper cup, and a beaker, is prepared, and the tare is accurately measured.

Then, the air bubbles and the like included in the tube (pump) is completely removed.

For example, if the values of set quantity are 50 and 200, the calibration operation is:

First, the signal key is depressed to allow a discharge signal to be given as in molding. Discharge is made 20 times or more. The more the number of discharge times, the more accurate the calibration.

A graph is drawn with the set quantity being chosen as the axis of abscissa, and the delivery as the axis of ordinates. For example, if the set quantity is 200, and the colorant delivery of 20 times in total is 16 g, the delivery of one time is 0.8 g, and if the set quantity is 50, and the colorant delivery of 20 times in total is 4 g, the delivery of one time is 0.2 g. When a plot is made of the above values of set quantity and delivery of one time, a graph of reference line as shown in FIG. 5 is obtained.

However, in the above example of conventional device, discharge is made 20 times or more, thus, if the number of discharge times should be wrongly counted, the result of computation of the delivery of one time tends to be greatly affected because the value of it is small.

SUMMARY OF THE INVENTION

The present invention has been developed in consideration of the above conventional situation, and the purpose of it is to provide a colored plastics molding device with which calibration is automatically performed, and thus the colorant can be charged, being free from wrong calculation and error, therefore, high-quality colored plastics molded items can be obtained.

The invention provides a colored plastics molding device comprising: a raw plastics material supply means which stores a raw plastics material for molding having a thermoplasticity and discharges the raw plastics material stored; a cylindrical transfer member which transfers the raw plastics material from this raw plastics material supply means; a colorant supply means which supplies a liquid colorant to the inside of said transfer member, the discharge end of a freely replaceable nozzle being disposed there; a conveying means which mixes the raw plastics material fed through said transfer means with the colorant, while conveying the mixture for molding; a detection means which detects the conveying state of said conveying means; and a control means which performs operation control of said colorant supply means on the basis of the result of detection by this detection means; wherein said colorant supply means has an automatic calibration function which allows automatic setting of the quantity of liquid colorant to be supplied.

The invention provides a colored plastics molding device wherein said colorant supply means has functions of setting of colorant set quantity, setting of speed, and setting of number of calibration discharge times; the value of total delivery of colorant is determined; and from the value of total delivery of colorant and the number of calibration discharge times, the value of delivery of colorant for one calibration discharge time is determined.

According to the invention, calibration is automatically performed, and thus the colorant can be charged, being free from wrong calculation and error, therefore, high-quality colored plastics molded items can be obtained.

BRIEF DESCRIPTION OF THE DRAWINGS

FIG. 5 is a graph showing the relationship between the delivery and the set quantity for the embodiment of the present invention.

DESCRIPTION OF THE PREFERRED EMBODIMENTS

Hereinbelow, an embodiment of the colored plastics molding device according to the present invention will be described with reference to the attached drawings.

Figure 1:
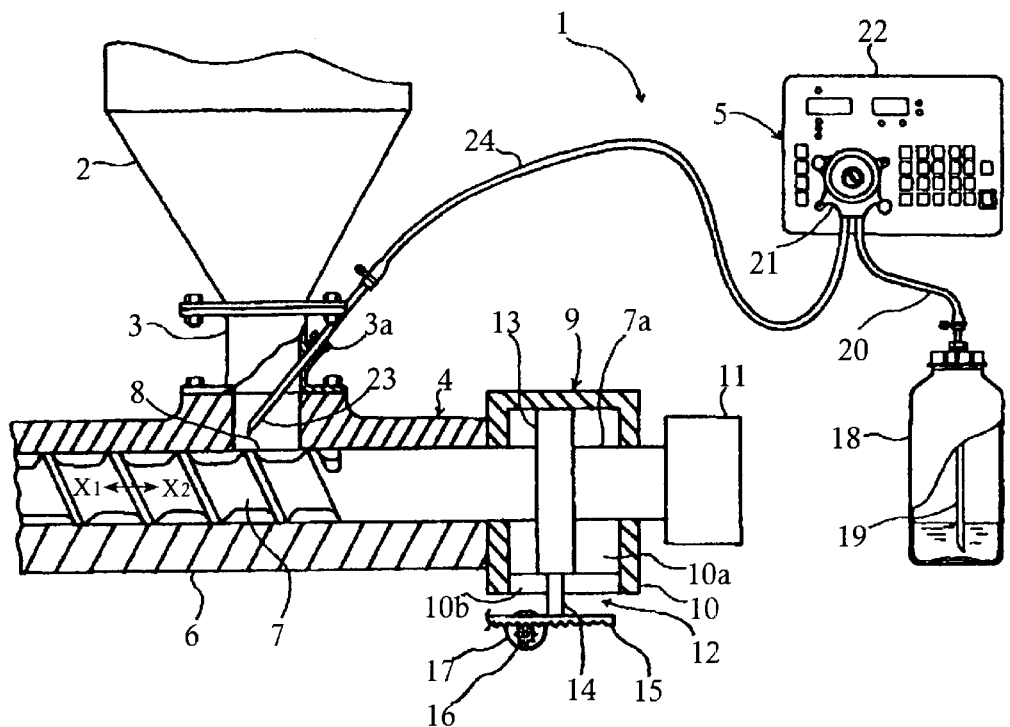
FIG. 1 is a sectional view, with portions broken away for the sake of clarity, of an embodiment of the present invention.

A colored plastics molding device 1 as shown in FIG. 1 comprises a hopper 2 as a raw plastics material supply means which stores raw plastics material (pellets and/or powder) for molding having a thermoplasticity and discharges it from a discharge opening provided at the bottom; a cylindrical transfer member (bracket) 3 which is vertically disposed, being connected to this discharge opening of the hopper 2 with a flange; a conveying means 4 connected to this transfer member 3; and a colorant supply means 5 which supplies a liquid colorant with a particular color (for example, red, purple, blue or the like) to the inside of said transfer member 3.

As shown in FIG. 1, said conveying means 4 is horizontally disposed, and comprises a cylinder 6 which is connected to the bottom of said conveying means 4; a screw 7 which is fitted to this cylinder 6 rotatably and slidably in the axial direction ($X_1$ or $X_2$ direction); a passage hole 8 which is connected to said transfer member 3, being provided in the wall of said cylinder 6; a screw drive 9 disposed at one end of said cylinder 6; and a well-known head (not shown) which is provided at the other end of said cylinder 6.

Said screw drive 9 comprises a box-like guide frame 10 which is disposed at one end of the cylinder 6 and through which the base portion 7a of the screw 7 is passed; and a screw drive means 11 which is connected to the end of the base portion 7a of the screw 7 to provide a moment for the screw 7, and a force to slide the screw 7 in the direction of the arrow $X_1$ or $X_2$.

Said screw drive 9 comprises a detection means 12 which detects the sliding position of said screw 7 in the direction of $X_1$ or $X_2$.

This detection means 12 comprises a guide piece 13 which is protruded from the base portion 7a in a guide space 10a in said guide frame 10, being in contact with the upper and lower ends of the guide space 10a; a protruding piece 14 which is protruded downward in FIG. 1 with one end being connected to the guide piece 13, and the other end being passed through a slide groove 10b provided in the guide frame 10; a rack 15 which is carried by the protruding piece 14; a pinion 16 which is engaged with this rack 15; and a potentiometer 17 which is connected to this pinion 16.

Figure 3:
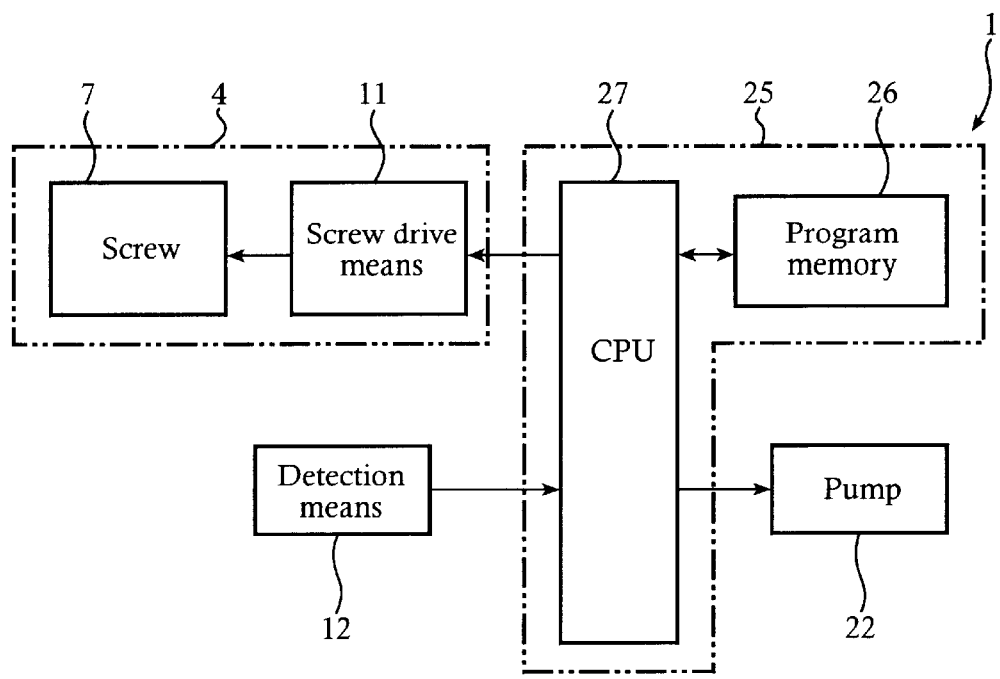
FIG. 3 is a block diagram of the control system of the embodiment of the present invention.

When the screw 7 is slid in the direction of $X_1$ or $X_2$, said detection means 12 feeds a detection signal corresponding to the angle of rotation of the pinion 16 which is turned as the guide piece 13 and the rack 15 are displaced, i.e., an output signal from the potentiometer 17 to a later described control means 25 (see FIG. 3).

The configuration of the screw 7 in the conveying means 4 of the device according to the present invention, further, the relative configuration of the screw 7 in the conveying means 4 to the detection means 12 are not limited to those as stated above with FIG. 1.

Figure 2:
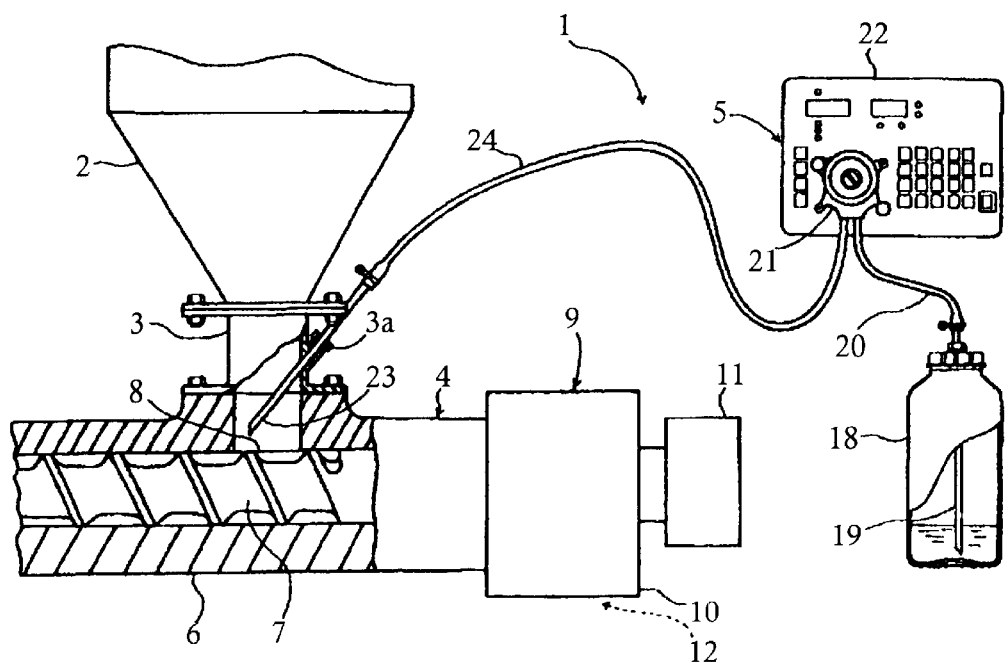
FIG. 2 is a sectional view, with portions broken away for the sake of clarity, of an embodiment of the present invention wherein the screw configuration in the conveying means is different from that as shown in FIG. 1.

In other words, as shown in FIG. 2, the screw 7 in the conveying means 4 may be configured such that it is only rotatably fitted to the cylinder 6. When the screw 7 is configured as such, the screw drive means 11 provides only a moment for the screw 7, and the detection means 12 detects only the rotation of the screw 7, and feeds a detection signal corresponding to the rotation angle, i.e., an output signal to the later described control means 25.

As shown in FIG. 1, said colorant supply means 5 comprises a container 18 which has a liquid colorant; a suction pipe 20 which is connected to a suction nozzle 19 provided in this container 18; a pump 22 which comprises a pump head 21 connected to the discharge side of this suction pipe 20; a freely replaceable discharge nozzle 23 which is inserted into a slantwise disposed nozzle receiver 3a provided in the wall of said transfer member 3, the discharge end being inserted into said passage hole 8; and a feed pipe 24 which connects said pump head 21 to the discharge nozzle 23.

Needless to say, the length of said suction pipe 20 and that of the feed pipe can be adjusted as required.

Next, the control system for the colored plastics molding device 1 will be described with reference to FIG. 3.

This control system comprises a control means 25 which performs control of the entire colored plastics molding device. The control means 25 comprises a program memory 26 which stores an operation program for controlling the operation of the device 1, and a CPU 27 which controls the entire device on the basis of said program.

Said operation program comprises a program for causing the pump 22 to provide a suction force for the freely replaceable discharge nozzle 23 on the basis of the detection signal from the detection means 12; a program for driving the pump 22 in synchronism with the conveying state of the conveying means 4, i.e., the rotation and sliding state of the screw 7; a program for driving the pump 22 at a definite speed and for a definite period of time; a program for delaying the start of the pump 22 by a definite period of time (approx. a few seconds); a program for stopping the pump 22 before the conveying state of the conveying means 4 being terminated; and a program for making the later described automatic calibration.

To said CPU 27 are connected said screw drive means 11, said detection means 12, and said pump 22.

Next, the function of the embodiment device 1 as configured above will be described.

In the following description of the function, the configuration of the screw 7 in the conveying means 4, and the relative configuration of the screw 7 in the conveying means 4 to the detection means 12 will be described with those as shown in FIG. 1. Also when the screw 7 is configured as shown in FIG. 2, the same function as stated below will be provided.

First, it is assumed that, as the initial condition, the container 18 has a red colorant, and the hopper 2 contains the raw plastics material.

Under this condition, when a start switch (not shown) is depressed, the CPU 27 drives the screw drive means 11 on the basis of said operation program. By this, the screw 7 starts to rotate in the cylinder 6 while sliding in the direction of $X_1$ or $X_2$, starting to convey the plastics material. With this rotation and sliding of the screw 7, said guide piece 13 and said rack 15 also slide in the direction of $X_1$ or $X_2$, the rack 15 turning the pinion 16. With the pinion 16 being turned, the potentiometer 17 feeds a detection signal corresponding to the displacement of the rack 15, i.e., that of the screw 7 to the CPU 27.

On the basis of this detection signal, the CPU 27 performs drive control of the pump 22 with the above-mentioned various programs in the operation program.

In other words, the CPU 27 starts to drive the pump 22 at a definite speed in synchronization with the screw 7 starting to rotate and slide, causing a red colorant to be discharged from the freely replaceable discharge nozzle 23, and continuing this operation as long as the screw 7 is rotated and slid.

By this, the raw plastics material and the red colorant are mixed in a definite ratio by the screw 7, while being fed to the head (not shown), where the mixture is compressed and heated to be fed to the mold or the like for manufacture of a particular type of molded item.

Instead of the above-stated style of drive control of the pump 22, a style of drive control with which the predetermined quantity of red colorant is discharged from the discharge nozzle at a definite rate for a definite period of time during the rotation and sliding of the screw 7 may be performed on the pump 22.

By using such style of pump drive control, in other words, colorant supply control, only a specific part of the colored plastics material fed from the head is colored red, thus this style of control can be used when the molded item is to be provided with a difference in color density.

Further, the CPU 27 can select a program for driving the pump 22 after the elapse of a definite period of time (approx. a few seconds) and performs drive control of the pump 22 on the basis of this program.

By adopting such style of drive control of the pump 22, the plastics material fed which is not colored at first can be gradually colored red, and in a short time uniformly colored red, thus, this style of control can provide a color gradation for the molded item.

Contrarily, the CPU 27 can select a style of drive control with which the pump 22 is stopped approx. a few seconds before the detection signal being cut off, i.e., the rotation and sliding of the screw 7 being terminated.

With such style of drive control, the color of the tail portion of the plastics material fed can be gradually changed from red to colorless, thus, this style of control can provide a color gradation for the molded item.

In addition to these various styles of drive control of the pump 22, the CPU 27 can reverse the pump 22 at the termination of the colorant discharge on the basis of the operation program to provide a suction force for the discharge nozzle 23.

With such style of pump drive control, mixture of useless colorant with the raw plastics material can be eliminated, and color change can be conveniently performed.

Next, the setting operation of the automatic calibrator of the present embodiment will be described with reference to FIG. 4.

Figure 4:
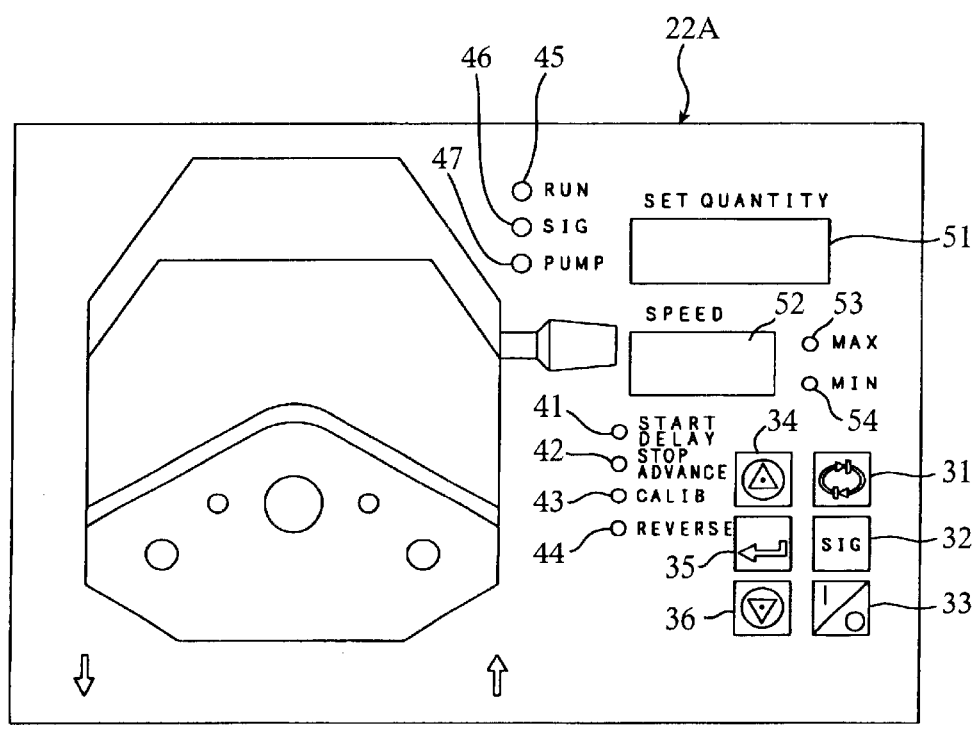
FIG. 4 is a plan view of the pump of the embodiment of the present invention that performs automatic calibration.

FIG. 4 shows the configuration of a pump 22A for use in automatic calibration. Having the same configuration of the pump 22 as shown in FIG. 1, this pump 22A comprises a mode key 31, a signal (SIG) key 32, an I/O key 33, an up arrow key 34, an enter key 35, and a down arrow key 36.

The pump 22A also comprises a START DELAY lamp 41, a STOP ADVANCE lamp 42, a CALIB (calibration) lamp 43, a REVERSE lamp 44, a RUN lamp 45, a SIG (signal) lamp 46, and a PUMP lamp 47.

Further, the pump 22A comprises a SET QUANTITY indicator 51, a SPEED indicator 52, a MAX lamp 53, and a MIN lamp 54.

Next, a particular operation of the setting operation of the automatic calibrator of the present invention will be described.

First, the mode key 31 is depressed until said CALIB lamp 43 goes on, then, the enter key 35 is pressed.

Next, the SET QUANTITY of calibrator is set by means of the up arrow key 34 and the down arrow key 36, and the enter key 35 is depressed. Then, the SPEED is set by use of the up arrow key 34 and the down arrow key 36, and the enter key 35 is pressed. Then, the number of calibration discharge times is set with the use of the up arrow key 34 and the down arrow key 36, and the enter key 35 is pressed. Now the setting operation is completed. Then depressing the I/O key 33 will activate the automatic calibrator.

After the completion of the operation, the weight of the container having the colorant is measured, and from the measurement, the weight of the container is subtracted. The result of the subtraction provides the total delivery of the colorant.

By dividing this value by the number of calibration discharge times set, the delivery of the colorant for one calibration discharge time for the pump head used and the tube size can be found.

For example, if the molding machine has a capacity of 65 g/shot, and the required quantity of colorant is 0.8% (which is indicated on the liquid color bottle), 65×0.008=0.52 g is the required quantity per shot.

In this case, by drawing a straight line from the point of 0.52 g on the axis of ordinates along the axis of abscissa (toward right) in the graph to mark the intersection with the reference line, and drawing a straight line downward from this mark, a SET QUANTITY of 130 can be determined.

Because the delivery varies depending upon the specific gravity and viscosity of the colorant used, it is necessary to make calibration for each particular type of colorant, and to exactly record the result of measurement as an important reference value without fail.

The present invention is not limited to the above-stated embodiment, and can be varied within the range of the spirit thereof. For example, the application of the colorant supply means 5 according to the present invention is not limited to the plastics molding device having a raw plastics material supply means, a transfer member, and a conveying member, and it can be applied to a wide variety of plastics molding devices.

As described above in detail, the present invention can provide a colored plastics molding device with which calibration is automatically performed, and thus the colorant can be charged, being free from wrong calculation and error, therefore, high-quality colored plastics molded items can be obtained.

What is claimed is:

1. A colored plastics molding device comprising:
   a raw plastics material supply means which stores a raw plastics material for molding having a thermoplasticity and discharges the raw plastics material stored;
   a cylindrical transfer member which transfers the raw plastics material from this raw plastics material supply means;
   a colorant supply means which supplies a liquid colorant to the inside of said transfer member, the discharge end of a freely replaceable nozzle being disposed there;
   a conveying means which mixes the raw plastics material fed through said transfer member with the colorant, while conveying the mixture for molding;
   a detection means which detects the conveying state of said conveying means; and
   a control means which performs operation control of said colorant supply means on the basis of the result of detection by this detection means;
   wherein said colorant supply means has an automatic calibration function which allows automatic setting of the quantity of liquid colorant to be supplied; and
   wherein said colorant supply means has functions of setting of colorant set quantity and setting of number of calibration discharge times; the value of total delivery of colorant is determined; and from the value of total delivery of colorant and the number of calibration discharge times, the value of delivery of colorant for one calibration discharge time is determined.

* * * * *